United States Patent Office 2,985,630
Patented May 23, 1961

2,985,630
CROSSLINKING POLYMERIC PRODUCTS OF ACRYLONITRILE

Raymond M. Price, Midland, and Arthur F. Roche, Freeland, Mich., assignors to The Dow Chemical Company, Midland, Mich., a corporation of Delaware No Drawing. Filed Sept. 18, 1957, Ser. No. 684,636

6 Claims. (Cl. 260—78.4)

This invention relates to a process for making crosslinked copolymers of acrylonitrile.

It has been discovered, in accordance with this invention, that crosslinked copolymers of acrylonitrile containing from 25 to 50 weight percent of acrylonitrile can be prepared by subjecting linear acrylonitrile copolymers under substantially anhydrous conditions to reaction with between 0.5 and 5 percent, polymer basis, of a member of the group consisting of the anhydrides of alkanoic acids having from 2 to 8 carbon atoms and the anhydrides of aromatic monocarboxylic and dicarboxylic acids. By "substantially anhydrous" is meant less than 0.1 weight percent of water, monomer basis.

The reaction is carried out at temperatures between 200° C. and the depolymerization temperature of the polymeric product in the presence or absence of air. The linear polymeric starting material can be prepared by polymerizing acrylonitrile in admixture with one or more members of the group consisting of styrene, α-methylstyrene and vinyltoluene by employing conventional polymerization procedures.

The linear copolymer starting materials containing between 25 and 50 weight percent acrylonitrile are soluble in methyl ethyl ketone, hereinafter referred to as M.E.K., hence the amount of insolubility in M.E.K. is a measure of crosslinking.

In practice, the crosslinking acid anhydride can be added to the monomer which is then polymerized by otherwise conventional mass or solution polymerization procedures, followed by a treatment at a temperature between 200° C. and the depolymerization temperature of the polymeric product to effect the crosslinking. Alternatively, the crosslinking acid anhydride can be added to the linear polymeric product followed by heating for at least four hours at a temperature between 200° C. and the depolymerization temperature of the polymeric product. In either case, it usually is unnecessary to heat at the crosslinking temperature for more than 24 hours.

The following examples show ways in which the invention has been practiced.

EXAMPLE 1

Two mixtures of 35 weight percent of acrylonitrile and 65 percent styrene were polymerized at 100° C. for six days under vacuum followed by heating at 200° C. for eight hours in air in the presence of 1.0 percent, polymer basis, of the following acid anhydrides. M.E.K. insoluble matter (crosslinked polymer) was determined by soaking samples of polymer in M.E.K., filtering off the insoluble material and drying in vaccum.

Table I

| Acid Anhydride | M.E.K. Insoluble, Percent |
|---|---|
| propionic | 51.5 |
| heptylic | 32.8 |

Similar advantageous results are obtained when vinyltoluene is substituted for styrene.

EXAMPLE 2

A series of mixtures of 40 weight percent acrylonitrile, 30 percent α-methylstyrene and 30 percent styrene was polymerized by heating at 100° C. for four days, then heated at 200° C. for five hours with exposure to air in the presence of 0.5 weight percent, polymer basis, of phthalic anhydride, formic acid (blank), glacial acetic acid (blank) and water (blank). Results are given in following Table II.

Table II

| Acid Anhydride | M.E.K. Insoluble, Percent |
|---|---|
| formic acid (blank) | 0.0 |
| glacial acetic acid (blank) | 0.0 |
| water (blank) | 0.0 |
| phthalic anhydride | 48.4 |

EXAMPLE 3

A series of 10 gram portions of a mixture of 40 weight percent acrylonitrile, 35 percent styrene and 35 percent α-methylstyrene was heat polymerized at 100° C. for 84 hours in admixture with one weight percent of the acid anhydrides indicated below, in the presence of air. Thereafter the resulting polymeric products were heated at 200° C. for 6½ hours in the presence of air with the following results on M.E.K. insolubility.

Table III

| Acid Anhydride | M.E.K. Insoluble, Percent | |
|---|---|---|
| | Before 200° C. treatment | After 200° C. treatment |
| benzoic | 0.0 | 51.5 |
| propionic | 0.0 | 57.5 |
| n-heptylic | 0.0 | 32.8 |

EXAMPLE 4

A series of mixtures of 35 weight percent acrylonitrile and 65 percent styrene containing 0.089 weight percent of water, monomer basis, and varying weight percentages of propionic anhydride, polymer basis, was polymerized at 100° C. for 6 days under vacuum, then heated at 200° C. for 8 hours in the presence of air. The amount of M.E.K. insoluble matter was determined at the end of the primary polymerization and after the 200° C. crosslinking treatment, with the following results.

Table IV

| Propionic Anhydride, Wt. Percent | M. E. K. Insoluble, Percent | |
|---|---|---|
| | Before 200° C. treatment | After 200° C. treatment |
| 0 (blank) | 0.0 | 0.0 |
| 0.25 | 0.0 | <0.2 |
| 0.5 | 0.3 | 9.0 |
| 2.0 | 0.0 | 59.1 |
| 5.0 | 0.0 | 69.8 |

What is claimed is:
1. A method for making crosslinked copolymers from linear copolymers of acrylonitrile and at least one comonomer of the group consisting of styrene, α-methylstyrene and vinyltoluene, by reacting between about 0.5 and 5 weight percent, linear polymer basis, of a crosslinking agent of the group consisting of anhydrides of alkanoic acids having from 2 to 8 carbon atoms and anhydrides of aromatic monocarboxylic and dicarboxylic acids with a linear polymeric product of the group consisting of linear copolymers of acryonitrile and at least one member of the group consisting of styrene, α-methylstyrene and vinyltoluene, said copolymers containing from 25 to 50 weight percent of combined acrylonitrile, the crosslinking being conducted under substantially anhydrous conditions by heating for at least 4 hours at a temperature between about 200° C. and the depolymerization temperature of the linear polymeric product.

2. The method of claim 1 wherein the crosslinking agent is propionic anhydride.

3. The method of claim 1 wherein the crosslinking agent is heptylic anhydride.

4. The method of claim 1 wherein the crosslinking agent is benzoic anhydride.

5. The method of claim 1 wherein the crosslinking agent is phthalic anhydride.

6. The method of claim 1 wherein the polymeric product is a linear polymer of 35 weight percent of acrylonitrile and 65 percent of styrene, the crosslinking agent is propionic anhydride amounting to 1 weight percent, polymer basis, and the crosslinking is carried out at 200° C. for eight hours.

References Cited in the file of this patent

UNITED STATES PATENTS

| | | |
|---|---|---|
| 2,439,227 | Seymour et al. | Apr. 6, 1948 |
| 2,682,524 | Coffman | June 29, 1954 |
| 2,751,277 | Coover et al. | June 19, 1956 |
| 2,759,910 | Milne | Aug. 21, 1956 |
| 2,901,468 | Meinel | Aug. 25, 1959 |

OTHER REFERENCES

Migdrichian: The Chemistry of Orangic Cyanogen Compounds, Rheinhold (1947), pp. 61–62.